(12) United States Patent
Basilico

(10) Patent No.: US 7,483,337 B2
(45) Date of Patent: *Jan. 27, 2009

(54) SYSTEM AND METHOD FOR EXTENDING GPS TO DIVERS AND UNDERWATER VEHICLES

(76) Inventor: Albert R. Basilico, 14025 Bingham Dr., Raleigh, NC (US) 27614

( * ) Notice: Subject to any disclaimer, the term of this patent is extended or adjusted under 35 U.S.C. 154(b) by 0 days.

This patent is subject to a terminal disclaimer.

(21) Appl. No.: 11/856,449

(22) Filed: Sep. 17, 2007

(65) Prior Publication Data

US 2008/0008045 A1   Jan. 10, 2008

Related U.S. Application Data

(63) Continuation-in-part of application No. 11/182,894, filed on Jul. 15, 2005, now Pat. No. 7,272,074.

(51) Int. Cl.
G01S 3/80 (2006.01)
G01C 21/00 (2006.01)
(52) U.S. Cl. ........................ 367/128; 701/213
(58) Field of Classification Search ........... 367/128; 342/357.06, 357.14; 701/213
See application file for complete search history.

(56) References Cited

U.S. PATENT DOCUMENTS

| | | | |
|---|---|---|---|
| 6,625,083 B2 * | 9/2003 | Vandenbroucke | 367/15 |
| 7,272,074 B2 * | 9/2007 | Basilico | 367/128 |
| 7,333,394 B2 * | 2/2008 | Basilico | 367/124 |
| 2004/0155815 A1 * | 8/2004 | Muncaster et al. | 342/357.09 |
| 2006/0215494 A1 * | 9/2006 | Thomas | 367/128 |
| 2006/0293806 A1 * | 12/2006 | Basilico | 701/21 |
| 2007/0014189 A1 * | 1/2007 | Basilico | 367/128 |
| 2008/0008045 A1 * | 1/2008 | Basilico | 367/128 |
| 2008/0046139 A1 * | 2/2008 | Basilico | 701/21 |

* cited by examiner

Primary Examiner—Dan Pihulic
(74) Attorney, Agent, or Firm—Coats & Bennett, P.L.L.C.

(57) ABSTRACT

A navigation system extends satellite navigation to divers, underwater vehicles, and surface vessels. The navigation system comprises a location reference unit and a plurality of sub-surface beacon units. The location reference unit includes a receiver to receive navigation signals from earth-orbiting satellites and/or an inertial navigation system. The location reference unit further includes processing circuits to communicate with to sub-surface beacon units and to transmit location information to said sub-surface beacon units, and a sonar transmitter to transmit location information to the sub-surface beacon units. The beacon units include processing circuits to determine the location of the beacon unit based on location information received from the location reference unit, and a sonar transceiver to receive location information from the location reference unit and to transmit location information to a diver unit to provide navigation assistance to the diver unit.

25 Claims, 11 Drawing Sheets

SYSTEM AND METHOD FOR EXTENDING GPS TO DIVERS AND UNDERWATER VEHICLES

RELATED APPLICATION

The application is a continuation-in-part and claims the benefit of U.S. patent application Ser. No. 11/182,894, filed 15 Jul. 2005, which is incorporated herein by reference.

BACKGROUND OF THE INVENTION

The present invention relates generally to underwater navigation and, more particularly, to a method and apparatus for extending GPS navigation to divers and underwater vehicles.

Satellite-based positioning systems, such as the Global Positioning System (GPS), provide the ability to accurately determine location virtually almost anywhere on the Earth's surface. The GPS comprises 24 earth-orbiting satellites located in 6 orbital planes. Each earth-orbiting satellite carries an atomic clock and continuously broadcasts radio signals indicating its current time and location. A receiver located on the Earth's surface can receive these radio signals and determine its distance from the satellites based on the time of arrival of the signals. By receiving signals from four satellites, an Earth-based receiver can determine its location by triangulation.

GPS signals do not propagate underwater. Consequently, divers and underwater vehicles beneath the water's surface are not able utilize these GPS signals to accurately navigate between two points. A number of systems have been proposed for extending GPS to underwater divers and vehicles. For example, U.S. Pat. Nos. 6,701,252 to Brown and U.S. Pat. No. 6,657,585 to Kucik disclose a floating buoy that is connected by a tether to a diver or underwater vehicle. The floating buoy carries a GPS antennas and/or receiver and conveys signals via the tether to the diver or underwater vehicle. This solution is limited in utility by the need for a tether connecting the underwater diver or vehicle to the floating buoy. U.S. Pat. No. 5,119,341 to Youngberg discloses a system for extending GPS to divers and vehicles beneath the water's surface using buoys that float freely on the surface. The floating buoys can receive signals from GPS satellites and can communicate underwater users using acoustic signals. However, the floating buoys do not stay in place, but instead drift on the surface of the water. Further, floating buoys are subject to easy detection and thus are not suitable for covert operations.

SUMMARY OF THE INVENTION

The present invention provides an underwater navigation system that effectively extends GPS to underwater users and devices. The present invention could also be used to provide navigation signals to surface moving vessels. The underwater navigation system comprises a plurality of sub-surface beacon units that are designed to sink to the ocean bottom and at least one location reference unit that is designed to initialize the beacon units with their location. The beacon units and the location reference unit are positioned in an area where navigation assistance is needed. The beacon units sink immediately to the ocean bottom. In one embodiment, the location reference unit remains partially above the surface to receive GPS signals from GPS satellites and determines its location using the received GPS signals. In another embodiment, the location reference unit is entirely submerged beneath the surface and determines its location using an inertial navigation system, Doppler system, or other similar system. Nonetheless, in either embodiment, the location reference unit remains at least partially below the surface to communicate with the sub-surface beacon units via acoustic signals. After its location is fixed, the location reference unit transmits its location to the sub-surface beacon units. In another embodiment, the location reference unit sequentially calculates the position offset of each beacon unit within range, combines the calculated offset with the location reference unit's latitude, longitude and rotational orientation (e.g. relative to magnetic north) and transmits the fully calculated beacon unit position to each beacon respectively. The beacon units can determine their location based on the signals received from the location reference unit and/or signals received from other beacon units. With their location established, the beacon units may then provide navigation assistance to divers, underwater craft, or surface vessels without the aid of the location reference unit. After a predetermined period of time, then, or after the location reference unit receives a position confirmation from a predetermined number of beacon units, the location reference unit is removed to avoid surface exposure. If the location reference unit comprises a buoy, for example, it may sink below the surface. If the location reference unit comprises a surface watercraft, a helicopter, or a submarine, however, it may simply transport itself to an area where it is unexposed. Because only the sub-surface beacon units remain in the area where navigation assistance is needed, the underwater navigation system may provide navigation assistance to users or devices without surface exposure.

DETAILED DESCRIPTION OF THE INVENTION

Figure 1:
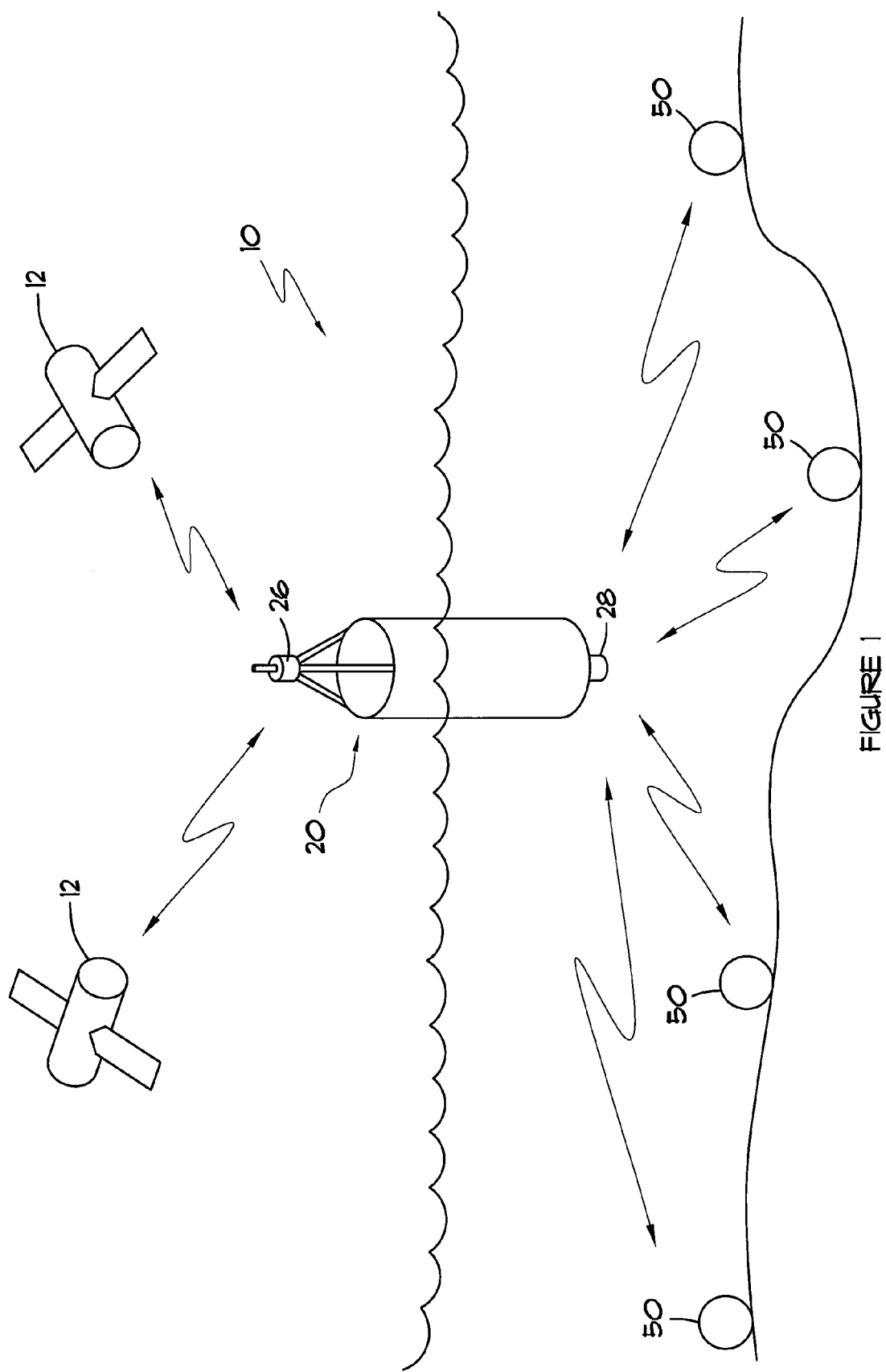
FIG. 1 illustrates an exemplary embodiment of the underwater navigation system according to the present invention that utilizes navigational signals received from earth orbiting satellites.

Referring now to the drawings, FIG. 1 illustrates a non-limiting example of an underwater navigation system 10 to provide navigation assistance to a diver, underwater vehicle, or surface vessel, which are referred to herein generically as guided units. The underwater navigation system 10 comprises at least one location reference unit 20 and a plurality of beacon units 50 located beneath the water's surface. The location reference unit 20 and the sub-surface beacon units 50 communicate using acoustic signals. The location reference unit 20 includes a sonar transceiver 28 for such communication. In the embodiment shown in FIG. 1, the location reference unit 20 also communicates with earth orbiting satellites 12 using navigational signals. Navigational signals, such as GPS signals provided from GPS satellites, permit the location reference unit 20 to determine its location. Land-based navigation systems, such as DGPS, could also be used in place of space-based satellites. The location reference unit 20 includes a receiver 26 for receiving these navigational signals from the earth orbiting satellites 12.

The beacon units 50 and location reference unit 20 are positioned in an area where navigation assistance is needed and within sufficient proximity of one another for communicating. The beacon units 50 are designed to sink immediately to the floor of a body of water, such as the ocean. The location reference unit 20 is designed such that its receiver 26, if present, remains above the surface to receive navigational signals from the earth orbiting satellites 12 and its sonar transceiver 28 remains below the surface to communicate with the beacon units 50. As illustrated below in alternative embodiments of the underwater navigation system, this may be accomplished in various ways depending on the implementation of the location reference unit 20. Regardless, the location reference unit 20 determines its location using the received navigational signals. After its location is fixed, the location reference unit 20 transmits its location to each of the beacon units 50. The beacon units 50 can then determine their location based on signals received from one or more location reference units 20. In some embodiments, the beacon units 50 may determine their location based on signals received from a single location reference unit 20. In other embodiments, the beacon units 50 may receive signals from multiple location reference units 20. The beacon units 50 may also exchange information between themselves to further refine position calculations. After initializing beacon units 50 within its communication range, a location reference unit 20 may change its function to become a beacon unit 50, by sinking entirely below the water surface and then itself being initialized to its location on or near the sea floor by one or more subsequently deployed location reference units 20.

Figure 2:
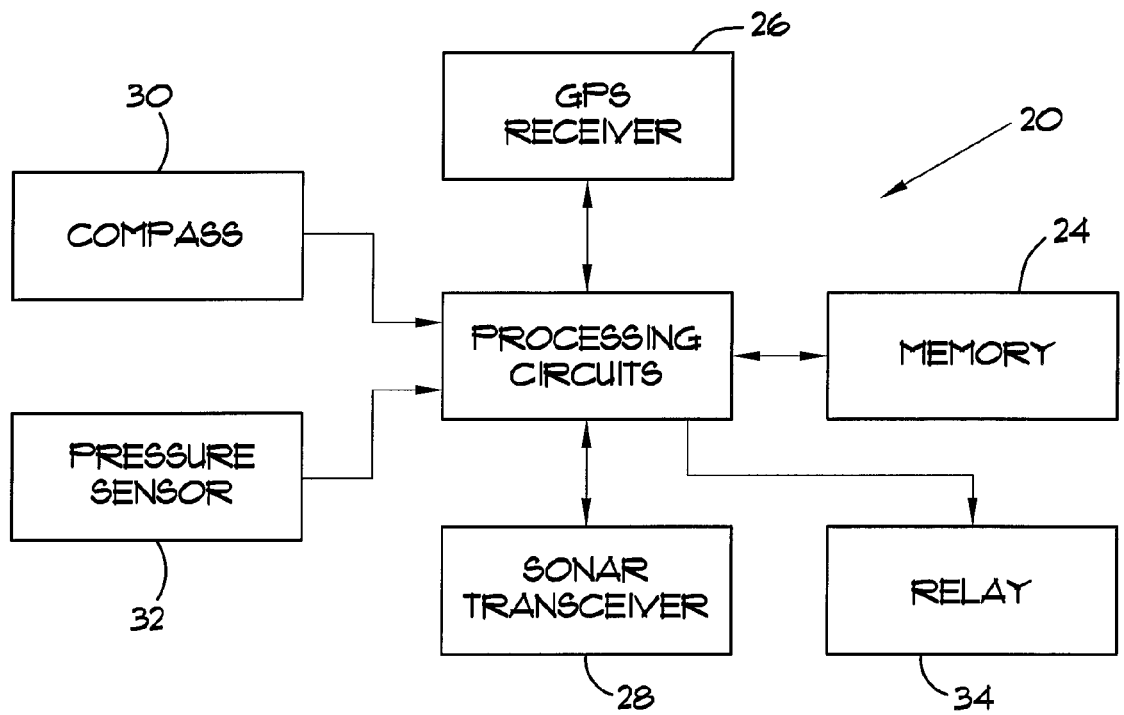
FIG. 2 illustrates an exemplary location reference unit for the underwater navigation system that utilizes navigational signals received from earth orbiting satellites.

For example, FIG. 2 illustrates the main components of the location reference unit 20. The location reference unit 20 comprises processing circuits 22, memory 24, a GPS receiver 26, a sonar transceiver 28, and a compass 30 to determine the rotational orientation of the location reference unit 20. If the location reference unit 20 also functions as a beacon unit 50, the location reference unit 20 may further include a pressure sensor 32 to determine its depth below the surface of the water. The processing circuits 22 control overall operation of the location reference unit 20, process position signals received by the GPS receiver 26, and generate information and control signals to be transmitted to the beacon units 50 via sonar transceiver 28. Processing circuits 22 also process information and control signals received from the beacon units 50. Memory 24 stores program instructions and data needed for operation. Sonar transceiver 28 is used for underwater communications with beacon units 50. Location reference units 20 could also use the sonar transceivers 28 or radio transceivers (not shown) to communicate with other location reference units 20. In some embodiments, the location reference unit 20 may further include a relay 34 activated by the processing circuits 22 to sink or destroy the location reference unit 20 after the beacon units 50 have determined their locations.

Figure 3:
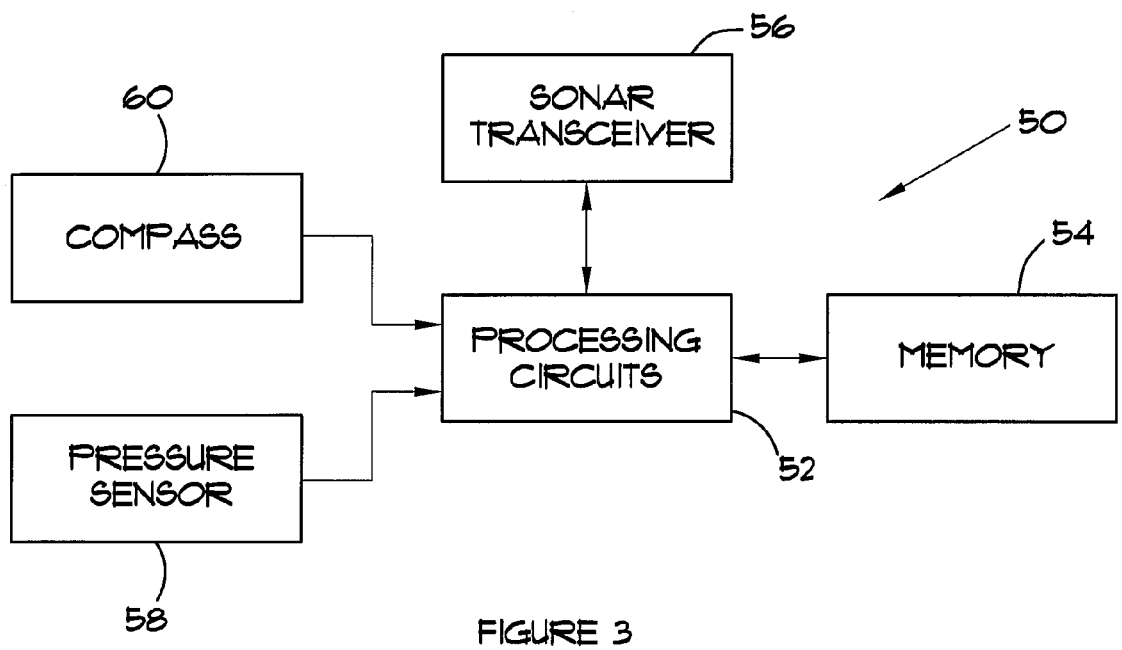
FIG. 3 illustrates an exemplary beacon unit for the underwater navigation system that utilizes navigational signals received from earth orbiting satellites.

FIG. 3 illustrates the main components of the beacon unit 50. Beacon unit 50 comprises processing circuits 52, memory 54, a sonar transceiver 56, and pressure sensor 58. Processing circuits 52 control the overall operation of the beacon unit 50, and process information and control signals received from the location reference unit 20, other beacon units 50, and/or diver units 100. Memory 54 stores program instructions and data needed for operation. Sonar transceiver 56 is used for underwater communications with the location reference unit(s) 20, other beacon units 50, and/or diver units 100. The pressure sensor 58 is used to determine the depth of the beacon unit 50, which may be used in some position calculations. In some embodiments, the beacon unit may further include a compass 60 to determine the rotational orientation of the beacon unit 50.

When the beacon units 50 are initially deployed, the beacon units 50 must determine their position after sinking to the ocean floor. While dropping to the ocean floor, ocean currents may carry the beacon units 50 a substantial distance from the original drop zone. Therefore, it is not sufficient for the beacon units 50 to determine their location before sinking. As earlier noted, the beacon units 50 determine their location after reaching the ocean floor by exchanging messages with one or more location reference units 20. Once the location of a beacon unit 50 is known, the beacon unit 50 can also serve as a location reference unit 20 for other beacon units 50. Two basic approaches may be taken to determine the location of the beacon units 50.

The first approach is based on the calculation of the distance from the beacon unit 50 to multiple location reference units 20. At least three location reference units 20 are needed to accurately determine the location of the beacon unit 50 using this method. Each location reference unit 20 determines its location based on receipt of GPS signals and transmits its location to the beacon unit 50. The distance of the beacon unit 50 from each location reference unit 20 is also determined. The distance may be determined by the location reference units 20 and transmitted to the beacon units 50, or may be determined by the beacon units 50 themselves. Based on the distance of the beacon unit 50 from the location reference units 20 and the location of the location reference units 20, the beacon unit 50 can determine its location accurately by triangulation. Because the beacon units 50 may be assumed to be below the surface of the water, a hence below the location reference units 20, the beacon units 50 can accurately determine their location based on its distance from three location reference units 20 and its depth. The depth of the beacon unit 50 may be determined based on a pressure sensor. Alternatively, one or more of the location reference units 20 could calculate the position of the beacon unit 50 based on distance measurements and transmit the location to the beacon unit 50.

The second approach requires only one location reference unit 20. In the second approach, the location reference unit 20 determines its location based on receipt of GPS signals and transmits its location to the beacon unit 50. The beacon unit 50 includes a compass to determine the rotational orientation of the beacon units 50. The beacon unit 50 determines the direction and distance to the location reference unit 20. With knowledge of the location reference unit's location and the vector extending between the location reference unit 20 and the beacon unit 50, the beacon unit 50 can accurately determine its location. Alternatively, the location reference unit 20 could include a compass and compute the location of the beacon unit 50 and transmit the computed location to the beacon unit 50.

Various techniques can be used for determining the distance between the location reference unit 20 and beacon unit 50. Three exemplary methods for determining distance are described below. These three methods are referred to herein as the time of arrival method, the time of travel method, and the dual tone method. Those skilled in the art will appreciate that the present invention is not limited to the methods enumerated herein and that other methods may be used for determining distance.

The time of arrival method requires clock synchronization between the location reference unit 20 and beacon unit 50. In this method, the beacon unit 50 sends a message to the location reference unit 20 requesting the location reference unit 20 to transmit a response message at a time known to the beacon unit 50. The request or response message may specify the transmit time, or the transmit time may be specified by a protocol. For example, the protocol may specify that the location reference unit 20 transmit a response message only when the m least significant bits of the location reference unit's clock are all 0. Because the clocks are synchronized, the beacon unit 50 can use the time of arrival of the signal to compute the distance to the location reference unit 20. Using the m least significant bits as a time of transmission reference is advantageous, however, it results in aliasing of the distance measurement. For example, the m least significant bits will be the same if the message is sent at exactly 2:05 and 2:06 PM. The ambiguity can be resolved by repeating the message and using the time of travel or dual tone methods described below.

The time of travel method does not require clock synchronization. In this method, the beacon unit 50 sends a message to the location reference unit 20. Upon receipt of the message by the location reference unit 20, the location reference unit 20 generates and sends a reply message to the beacon unit 50. The reply message includes a delay value indicating the delay between the time the first message was received at the location reference unit 20 and the time that the reply message was sent. The beacon unit 50 may use the round trip time and the turnaround delay to compute the distance to the location reference unit 20.

The dual tone method uses the fact that acoustic signals transmitted at different frequencies will attenuate at different rates. In this method, the beacon unit 50 sends a message to the location reference unit 20 requesting the location reference unit 20 to send a dual tone signal. In response, the location reference unit 20 transmits a dual tone signal comprising two distinct tones. The distinct tones may be transmitted with equal power. Alternatively, the distinct tones can be transmitted at different power levels if the power levels, or the power ratio, are known. The power in each tone will attenuate as a known function of the distance traveled. With knowledge of the attenuation rate for each tone component, the beacon unit 50 can compute distance to the location reference unit 20 based on the difference in the received power of the tone components.

Those skilled in the art will appreciate that the operations of the beacon unit 50 and location reference unit 20 in the distance calculation could be reversed. That is, the location reference unit 20 could compute the distance to the beacon unit 50 and transmit the distance to the beacon unit 50.

To determine the direction to the location reference unit 20, the sonar transceiver for the beacon unit 50 comprises an array of sonar transducers. Assuming that the rate of travel of a signal in water is known, the beacon unit 50 can compute the direction to the location reference unit 20 based on the time difference of arrival of a signal transmitted by the location reference unit 20 at each of the sonar transducers. In a preferred embodiment, three (3) receiver transducers are positioned such that one transducer lies along a line perpendicular to a line drawn between the other two transducers. If the beacon unit 50 is positioned above the sea floor such that divers or underwater vehicles could operate below the beacon unit, then four (4) transducers are used, with the fourth transducer placed out of the plane defined by the first three transducers.

During deployment of the beacon units 50, the location reference unit 20 acts as a master unit and controls communication with the beacon units 50. The beacon units 50 sink to the ocean floor and remain silent until activated by the location reference unit 20. The location reference unit 20 may activate the beacon units 50 one at a time by sending an activation code to the beacon unit 50. Alternatively, the beacon units 50 could initiate communication with the location reference unit 20 after reaching the floor of the ocean. After waking, the beacon unit 50 determines its location as previously described by exchanging signals with the location reference unit 20. Once the beacon unit 50 has determined its position, the beacon unit 50 may send a confirmation message to the location reference unit 20. The confirmation message indicates to the location reference unit 20 that the beacon unit 50 has determined its location. The location reference unit 20 can then send a de-activation code to the beacon unit 50 so that the beacon unit 50 returns to a sleep mode. In sleep mode, the transmitter of the beacon unit 50 is turned off, but the beacon unit 50 periodically activates the receiver to monitor for incoming messages. The beacon unit 50 will remain in an inactive mode or sleep mode until it receives an activation code. In some embodiments, the beacon units 50 may be programmed to wake at a predetermined time to avoid the need to transmit an activation code to wake the beacon unit 50.

After a predetermined period of time or after receiving a confirmation message from a predetermined set of beacon units 50, the location reference unit 20 is removed from or leaves the area to avoid detection and thereby permit covert underwater navigation in the area. The means by which the location reference unit 20 is removed may depend on the specific implementation and design of the location reference unit 20. In some embodiments, the location reference unit 20 may sink or destroy itself after the beacon units 50 determine their location. In other embodiments, the location reference unit 20 may comprise a surface vessel, aircraft, or underwater vehicle that can leave the vicinity of the beacon units 50 once the beacon units 50 are deployed and their location determined.

In the embodiment illustrated in FIG. 1, for example, the location reference unit 20 is implemented as a surface unit comprising a surface buoy. The surface buoy and beacon units 50 are both dropped into the ocean, such as by aircraft. The beacon units 50 sink to the ocean bottom while the surface buoy floats on the surface long enough for the sunken beacon units 50 to determine their locations. Once the beacon units 50 have determined their locations, the surface buoy may sink or self-destruct. Alternatively, the surface buoys can be removed by a surface vessel, aircraft, or underwater vehicle.

To sink or destroy the surface buoy, the location reference unit 20 may further include a relay 34. The relay 34 is actuated by the processing circuits 22 to sink or destroy the surface buoy after a predetermined period of time or after a certain number of the beacon units 50 have established their locations. The processing circuits 22 may, for example, generate a control signal that causes the surface buoy to sink or self destruct. In one embodiment, the control signal activates a relay 34 that controls a mechanical system on the surface buoy. For example, activation of the relay 34 may cause floatation devices attached to the surface buoy to detach, thus allowing the surface buoy to sink. In another embodiment, the relay 34 may open a valve, causing a ballast tank to flood with water. The particular mechanism employed to effectuate the sinking or destruction of the surface buoy is not a material aspect of the invention. Any known methods for sinking or destroying the surface buoy can be used. In some embodiments, the location reference unit 20 may switch to a beacon unit mode upon sinking and thereafter function as any other beacon unit 50.

Figure 4:
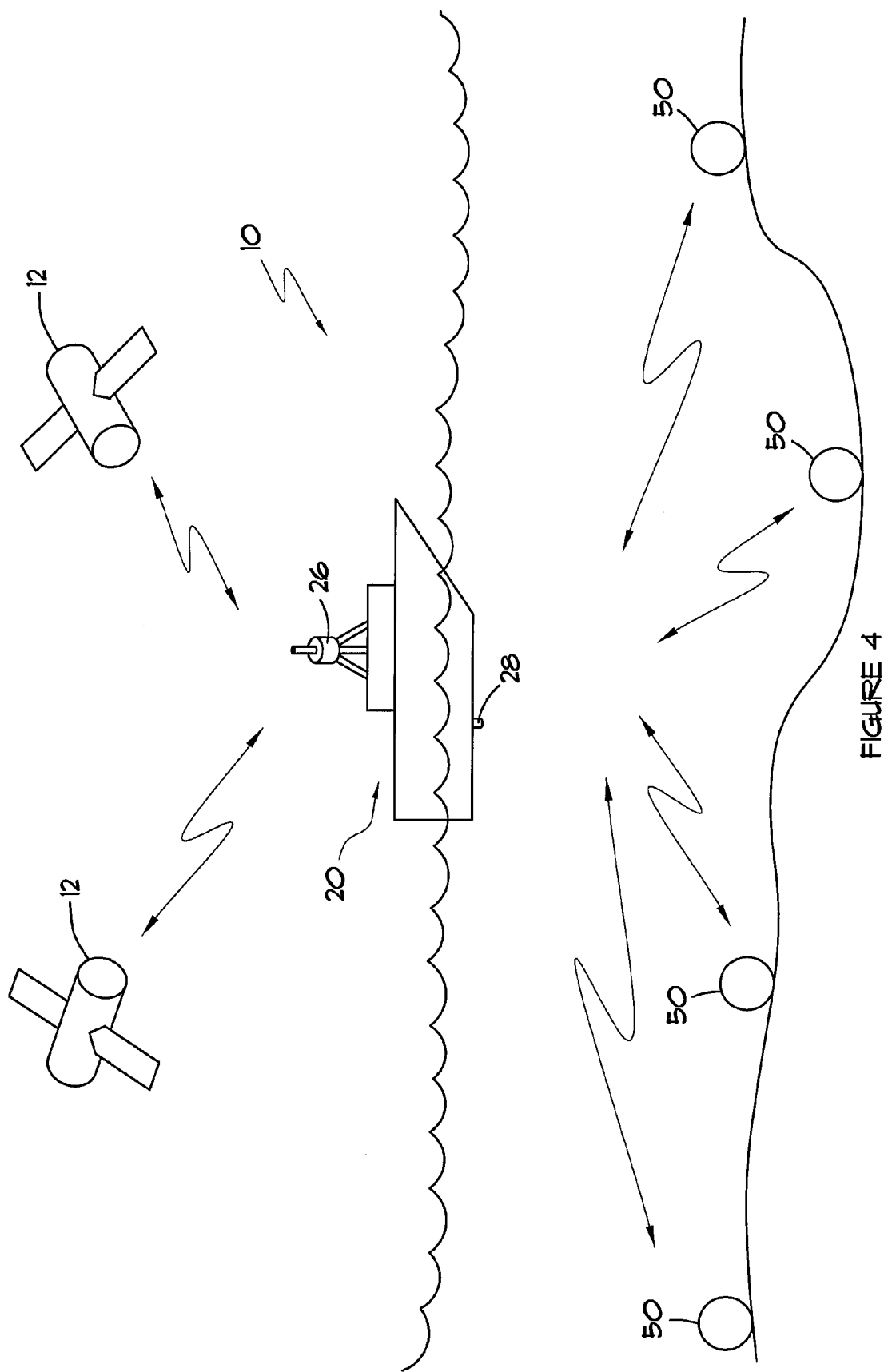
FIGS. 4 and 5 illustrate alternative embodiments of the underwater navigation system that utilizes navigational signals received from earth orbiting satellites.

As illustrated in FIG. 4, however, the location reference unit may comprise a surface vessel. In such instances, the surface vessel may simply ship into the area where underwater navigation assistance is needed, drop the beacon units 50, transmit location information received from receiver 26 to the beacon units 50 via sonar transceiver 28, and ship out of the area after the beacon units 50 determine their location. Because the surface watercraft can transport itself to an area where it is unexposed, easy detection of the underwater navigation system 10 on the surface is minimized without sinking or destroying the location reference unit 20.

Figure 5:
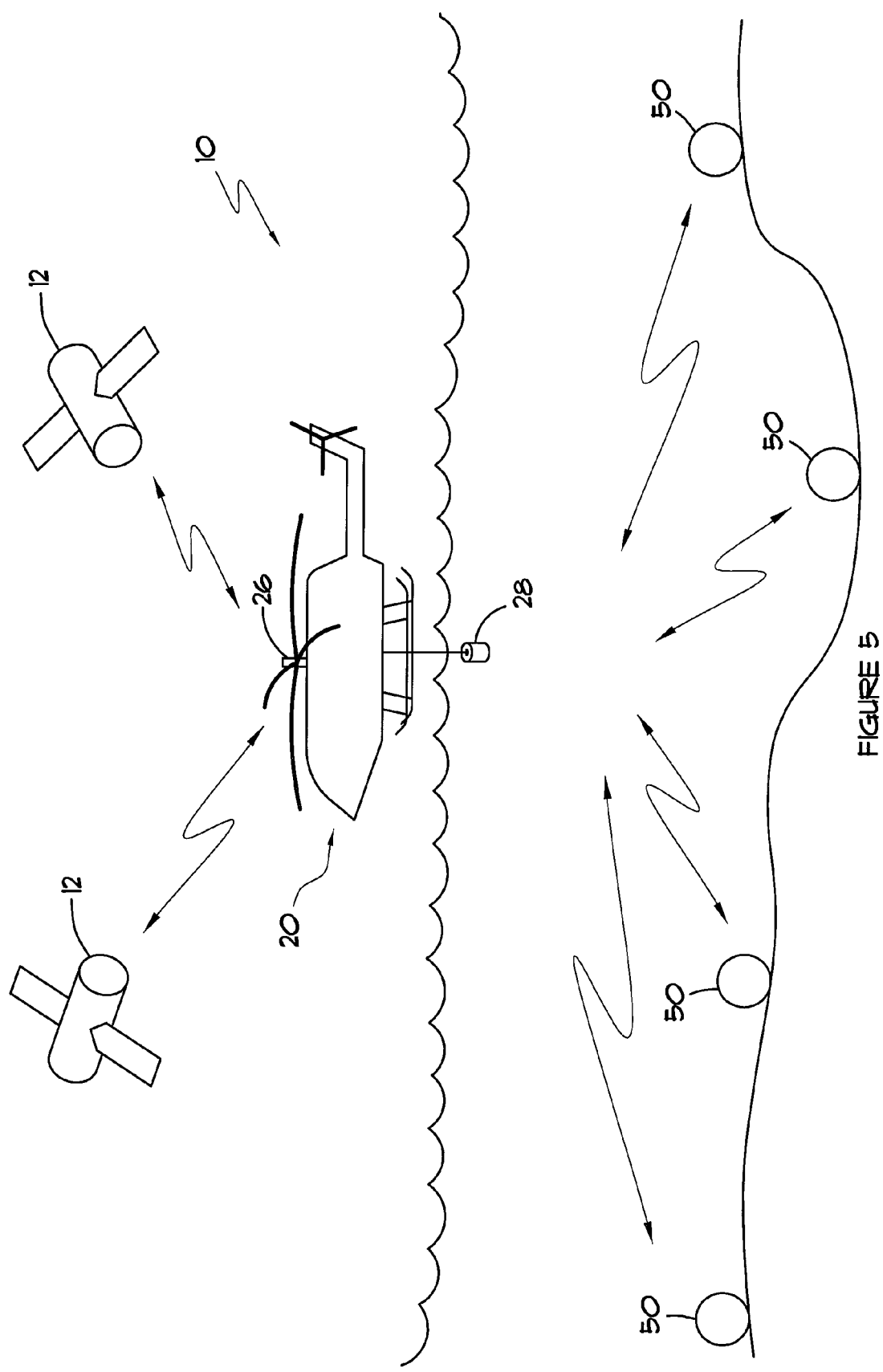

Likewise, the location reference unit 20 may comprise a helicopter, as illustrated in FIG. 5. Again, re-positioning of the location reference unit 20 by sinking or destroying it is likely undesirable and unnecessary. Rather, the helicopter may fly into the area where underwater navigation assistance is needed, drop the beacon units 50, transmit location information received from receiver 26 to the beacon units 50 via dipping sonar transceiver 28 into the water, and fly out of the area after the beacon units 50 determine their location. As the helicopter can transport itself to an area where it is unexposed, easy detection of the underwater navigation system 10 on the surface is minimized without sinking or destroying the location reference unit 20.

The embodiments illustrated thus far in FIGS. 1-5 have all relied upon communication with earth orbiting satellites 12 or terrestrial navigation systems at the area where navigation assistance is needed to determine the location of the location reference unit 20. Such communication permits very accurate localization, but requires surface exposure in the area for at least the amount of time necessary for a number of the beacon units 50 to determine their location.

Figure 6:
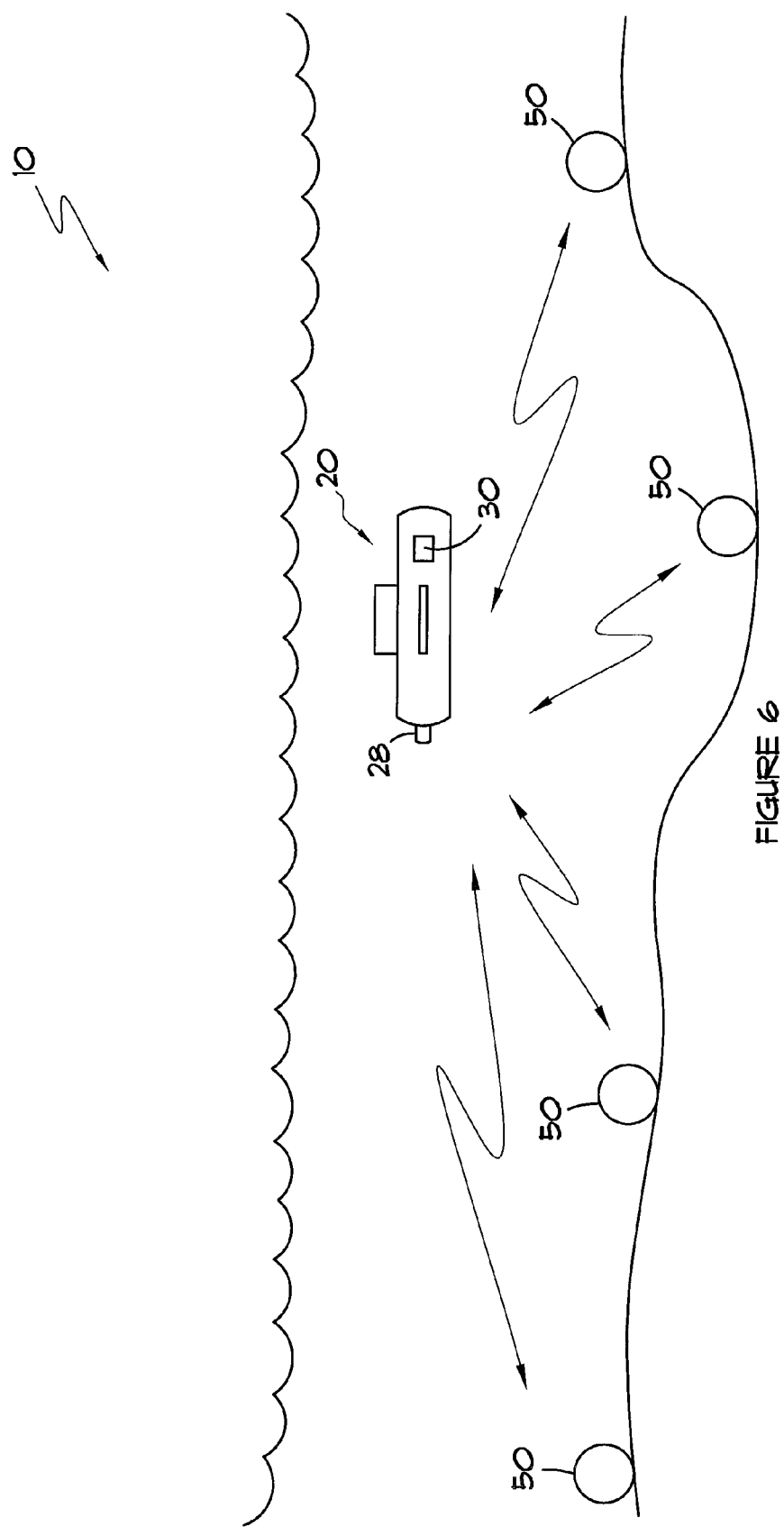
FIG. 6 illustrates an exemplary embodiment of the underwater navigation system according to the present invention that utilizes an inertial navigation system.

FIG. 6 illustrates an alternative embodiment of an underwater navigation system 10. In this embodiment, the location reference unit 20 comprises an underwater vehicle which remains below the surface to communicate location information as described above to the beacon units 50. The location reference unit 20 may determine its location while it is on the surface of the water. While the location reference unit 20 is submerged, it may use an inertial navigation system 40 (FIG. 7) to keep track of its location.

The inertial navigation system 40 may, for example, measure the linear and angular acceleration applied to the location reference unit 20 since being at the starting location. Such internal measurements do not rely on navigational signals receivable only at the surface and may be made while the location reference unit 20 is entirely submerged. The only necessary exposure of the location reference unit 20 to the surface, therefore, occurs when determining the starting location with navigational signals.

Using an inertial navigation system 40, then, the location reference unit 20 may determine a starting location by receiving navigational signals at an area other than where underwater navigation assistance is needed. Also, the starting location may be the known coordinates of a port of call. The location reference unit 20 may thereafter submerge and travel to the area where underwater navigation assistance is needed. While traveling beneath the surface, the inertial navigation system 40 tracks the location of the location reference unit 20. Upon reaching the area where underwater navigation assistance is needed, the location reference unit 20 transmits location information determined by the inertial navigation system 40 to the beacon units 50. Because the inertial navigation system 40 determines the location of the location reference unit 20 without relying on navigational signals received at the area where underwater navigation assistance is needed, surface exposure in this area is eliminated.

Figure 7:
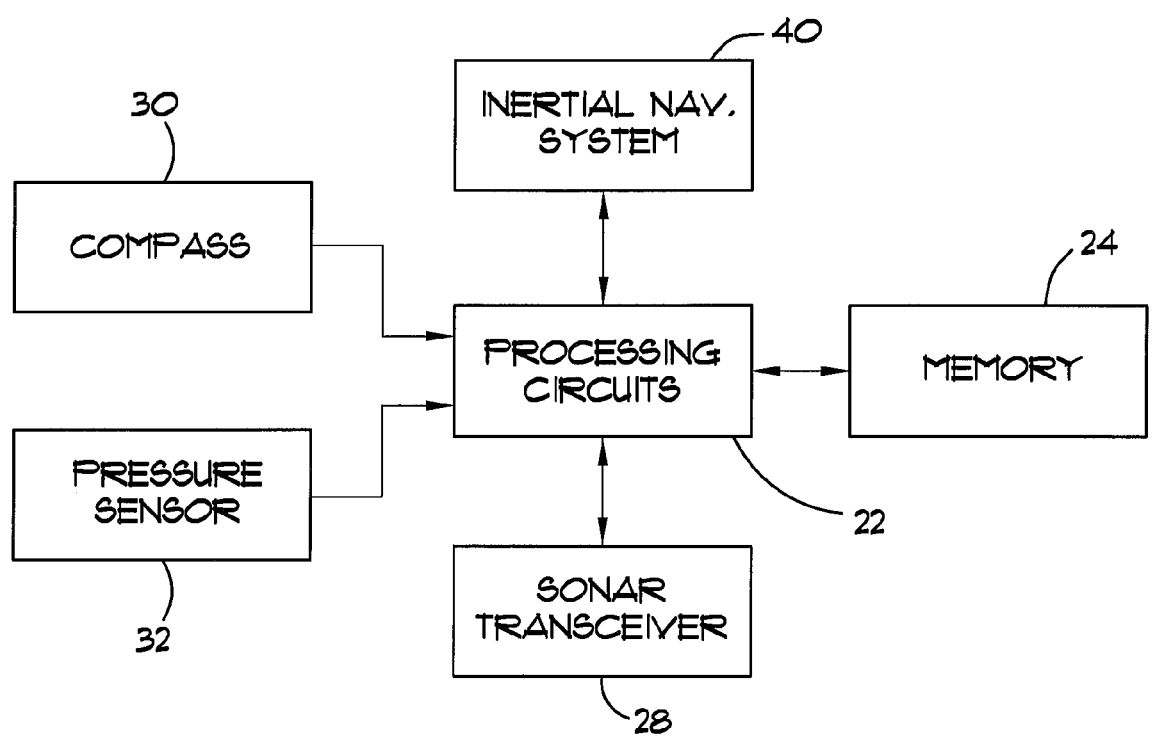
FIG. 7 illustrates an exemplary location reference unit for the underwater navigation system that utilizes an inertial navigation system or Doppler system.

The main components of the location reference unit 20 utilizing an inertial navigation system 40 are illustrated in FIG. 7. The location reference unit 20 comprises processing circuits 22, memory 24, a sonar transceiver 28, and an inertial navigation system 40. Analogous to the embodiment described in FIG. 2, the processing circuits 22 control overall operation of the location reference unit 20, process position signals received by the inertial navigation system 40, and generate information and control signals to be transmitted to the beacon units 50 via sonar transceiver 28. The processing circuits 22 also process information and control signals received from the beacon units 50. The memory 24 stores program instructions and data needed for operation. The sonar transceiver 28 is used for underwater communications with beacon units 50. The compass 30 is used to determine the rotational orientation of the underwater vehicle and the pressure sensor 32 is used to determine its depth below the surface of the water. The inertial navigation system 40 tracks the current location of the underwater vehicle from a known location.

Like the embodiments described previously, after a predetermined period of time or after receiving a confirmation message from a predetermined set of beacon units 50, the location reference unit 20 leaves the area where the beacon units 50 are deployed to prevent discovery. Because the submarine can transport itself to an area where it is unexposed, easy detection of the underwater navigation system 10 on the surface is eliminated without sinking or destroying the location reference unit 20.

It should be noted, however, that while the embodiments of FIGS. 6 and 7 provide location information to beacon units 50 without surface exposure, the accuracy of such location information may be less than that provided by the embodiments of FIGS. 1-5. Because the inertial navigation system 40 may be unable to account for drift in location not caused by applied linear or angular acceleration, the location information provided may be offset. This may be the case, for example, in areas having strong ocean currents. Such offset may be minimized by limiting the distance traveled between the starting location and the area where underwater navigation assistance is needed, thereby decreasing the accumulated drift. This, however, requires surface exposure closer to the area where underwater navigation assistance is needed. Utilization of these alternative embodiments, therefore, may depend on the particular requirements for surface exposure and accuracy of localization.

Figure 8:
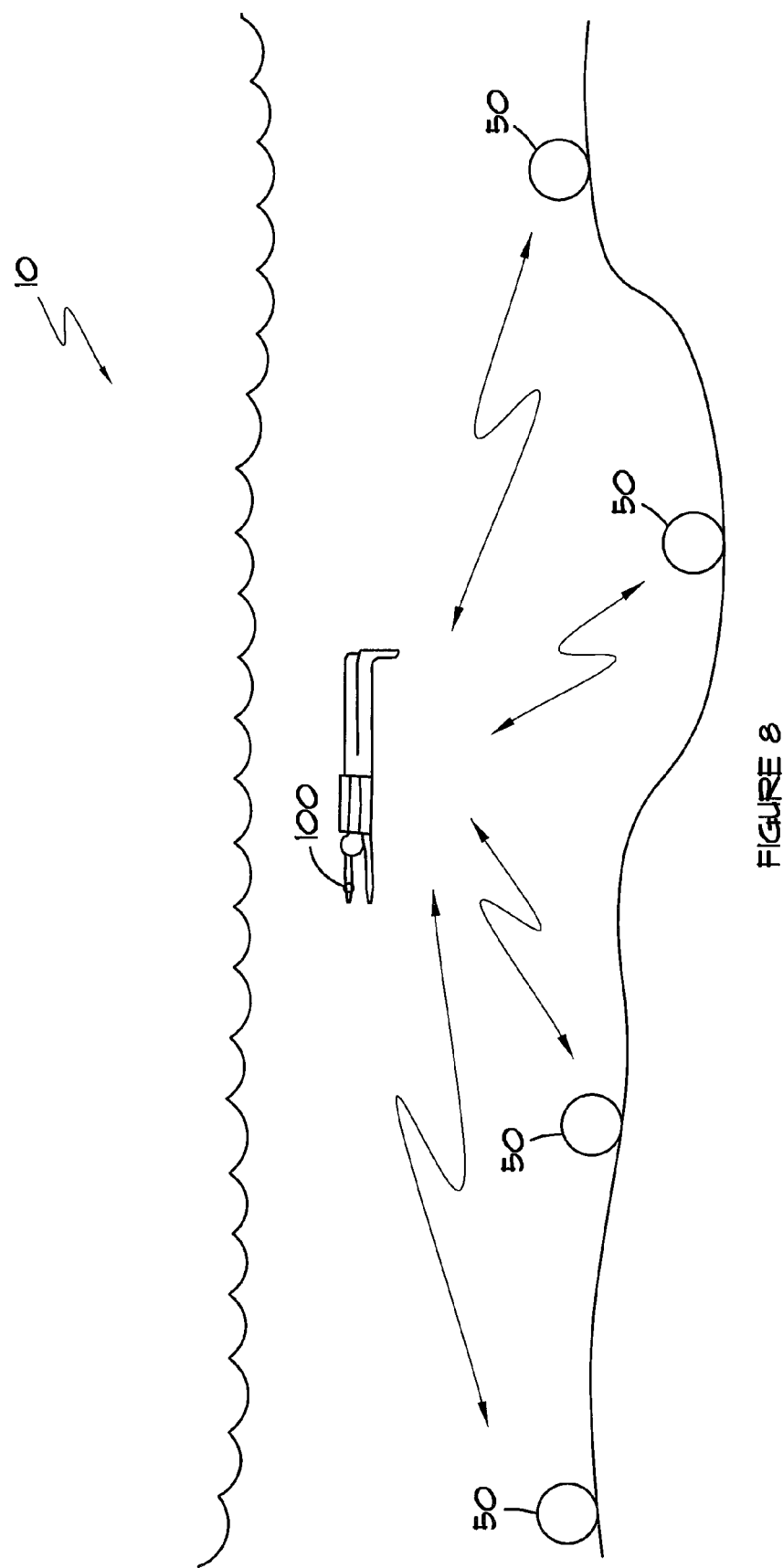
FIG. 8 illustrates an exemplary embodiment of the underwater navigation system according to the present invention, irrespective of whether it utilizes navigational signals received from earth orbiting satellites or utilizes an inertial navigation system.

FIG. 8 illustrates that after the beacon units 50 are deployed, the beacon units 50 can be used by divers or underwater vehicles to navigate covertly without any surface exposure. The beacon units 50 could also provide navigation assistance to surface vessels. The diver carries a diver unit 100 that communicates with the previously-deployed beacon units 50. Each beacon unit 50 knows its location and can transmit its location to the diver unit 100. The methods described above for determining the location of the beacon units 50 can also be employed by the diver units 100 to determine their location. In this case, the beacon units 50 provide the location reference for the diver unit 100.

Figure 9:
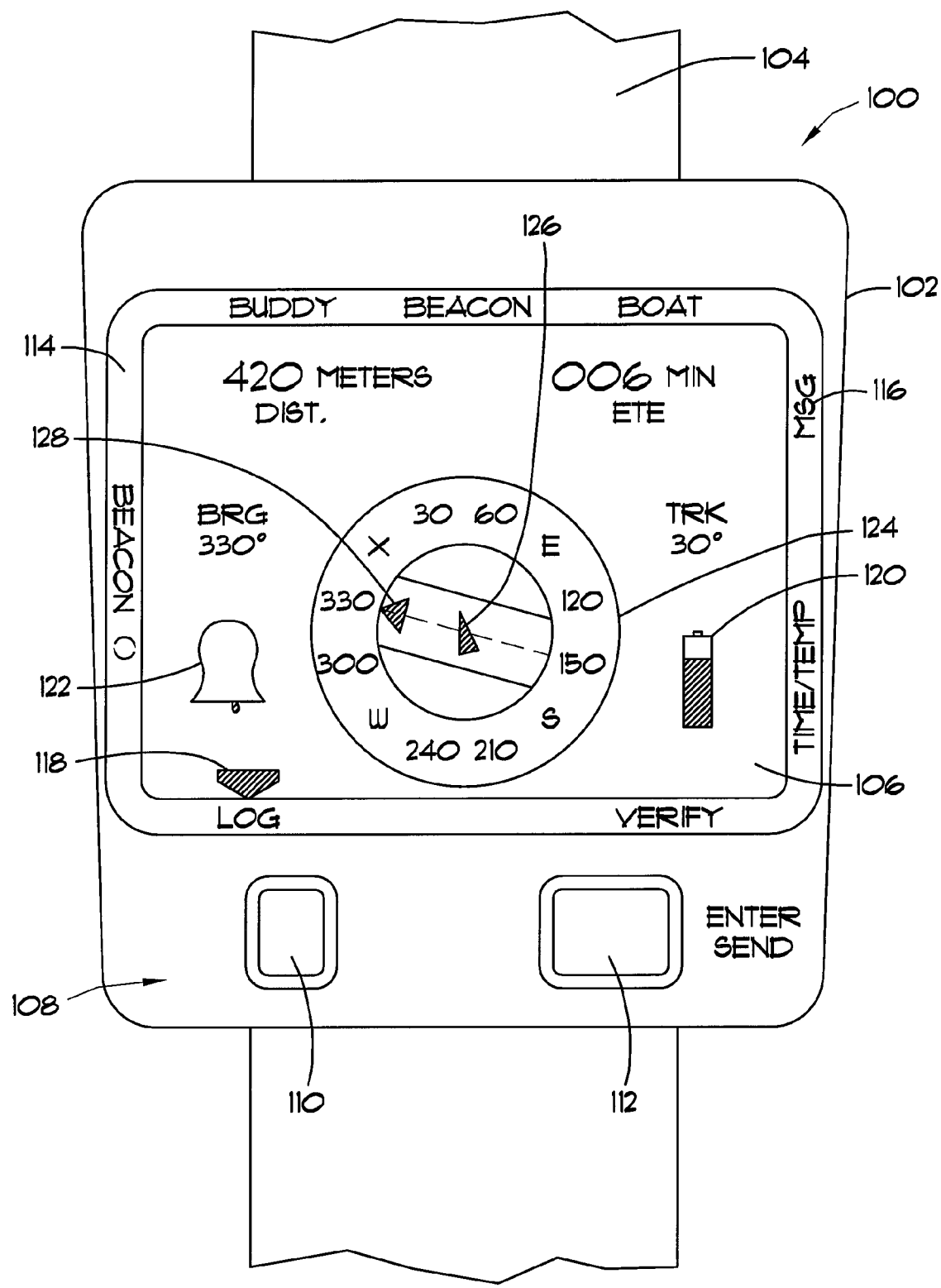
FIGS. 9 and 10 illustrate an exemplary diver unit for the underwater navigation system.
Figure 10:
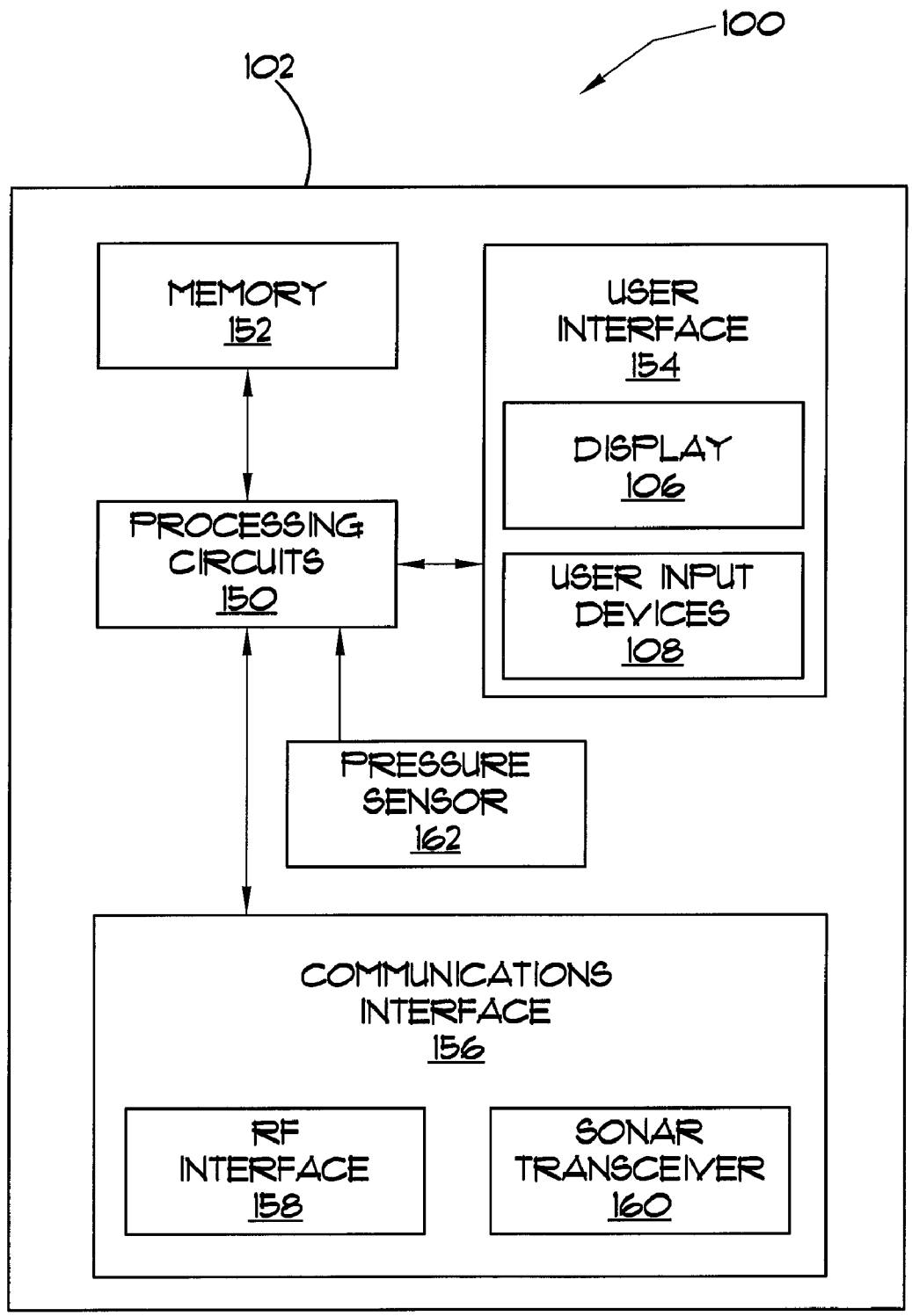

FIGS. 9 and 10 illustrate an exemplary diver unit 100. The diver unit 100 comprises a waterproof housing 102 mounted on a wristband 104. The diver unit 100 includes an electronic display 106, such as a liquid crystal display, and one or more input devices 108. The exemplary embodiment shown in FIG. 9 includes a scroll wheel 110 and a SEND/ENTER button 112. Those skilled in the art will recognize that other input devices, such as a joystick controller, keypad or touchpad, could be used for user input. Additionally, the display 106 may comprise a touchscreen display to receive user input.

The border 114 of the display 106 includes a series of labels 116 that describe various functions of the diver unit 100, e.g., "buddy," "beacon," etc. A function indicator 118 points to the currently selected function. In FIG. 9, the function indicator 118 indicates that the log function is selected. Additionally, display 106 may display other status indicators, such as power indicator 120 and alarm indicator 122, to provide the user with status information. The function indicator 118 can be moved to select a function by rotating the scroll wheel 110 and pressing the "ENTER/SEND" button 112. Selection of a function may change the operating mode of the diver unit 100. Scroll wheel 110 and button 112 may perform differently depending on the current operating mode. For example, after a function is selected, the scroll wheel 110 could be used to scroll through menu options or lists presented on the display 106.

In addition to status indicators, the display 106 is used to output useful information to the diver for viewing. In the exemplary embodiment, the display 106 can display a directional indicator 124. As will be described in more detail below, the directional indicator 124 is used to indicate direction to a target and the current track for navigating under water. In the embodiment shown, the directional indicator 124 includes a first pointer 126 showing the current track, and a second pointer 128 showing the direction to the target. The display 106 may also display numeric and alphanumeric data to the diver. In the exemplary embodiment shown in FIG. 9, the display 106 is displaying the distance to a target (DIST) (420 meters), the estimated time en route (ETE) (6 min), the bearing (BRG) to the target (340 degrees), and the current track (40 degrees). Other information, such as the current depth, current time, current temperature and the current latitude and longitude, or any other useful information could also be displayed. These examples are not intended to be a comprehensive list of all information that can be displayed, but merely illustrative of the types of information that may be displayed.

FIG. 10 is a functional block diagram illustrating the main components of the diver unit 100. The main components comprise processing circuits 150 for processing data and controlling operation of the diver unit 100, memory 152 for storing code and data used by the processing circuits 150, a user interface 154 that includes the display 106 and user input devices 108, and a communications interface 156. The processing circuits 150 may comprise one or more programmable processors, which may be general purpose microprocessors, microcontrollers, digital signal processors, or a combination thereof. Memory 152 represents the entire hierarchy of memory within the diver unit 100 and may comprise discrete memory devices, or may comprise internal memory in one or more microprocessors. The communications interface 156 comprises a radio interface 158 for use above water, and a sonar transceiver 60 for underwater communications. The radio interface may comprise, for example, a conventional BLUETOOTH, 802.11b, or 802.11g interface. The diver unit 100 may further include a pressure sensor 162 to determine depth below the water's surface.

The diver units 100 use a request/response signaling scheme to communicate with beacon units 50. The diver units 100 send a request message to either a beacon unit 50 or another diver unit 100 to initiate a transaction. Response messages are sent in reply to request messages. More than one response message may be sent in reply to a request message. The request message and all corresponding response message constitute a transaction. In the exemplary embodiment, the beacon units 50 do not send request messages, but only send response messages in reply to request messages from the diver units 100. A multiple access schemes, such as frequency division multiple access, time division multiple access, or code division multiple access, may be used to enable communications between the beacon units 50 and multiple diver units 100.

When a diver unit 100 needs to determine its location, the diver unit 100 sends a request message containing an activation code to a beacon unit 50 to initiate communications with the beacon unit 50. The activation code may be encrypted to prevent unauthorized users from activating the beacon unit 50. The beacon unit 50 may also authenticate diver units 100 via a pre-programmed list of diver unit (source) addresses or IDs that are permitted to obtain information from the beacon unit 50. The diver unit 100 may initiate communications with more than one beacon unit 50. After waking, the beacon unit 50 sends a reply message. The diver unit 100 can then send request messages to the beacon unit 50 to obtain navigation assistance. Exemplary uses of request messages include synchronizing clocks with a beacon unit 50 or establishing location. Once activated, the beacon unit 50 will remain awake until receipt of a deactivation code from the diver unit 100, or until a predetermined period of time has elapsed without any communications. While in an active or wake state, the beacon units 50 will receive and respond to authorized request messages. Various techniques can be used to prevent the beacon unit 50 from responding to unauthorized requests. For example, the beacon unit 50 may require diver units 100 and other units sending requests to provide authentication before responding to the requests. Additionally, the beacon unit 50 may transmit a periodic signal while in the active state to enable diver units 100 to periodically update their location without the need to send an explicit request message to the beacon unit 50. For example, the beacon unit 50 may periodically transmit a periodic message containing a time stamp indicating when the periodic message was transmitted. If the diver unit clock is synchronized with the beacon unit clock, the periodic message can be used by the diver unit 100 to determine distance to the beacon unit 50. The periodic message could also be used to determine direction to the beacon unit 50. If the diver unit clock is not synchronized, the periodic message could be a dual tone signal so that the diver unit 100 can determine distance by the received power of the tone frequencies.

In one exemplary embodiment, a time division multiple access scheme is used to enable a plurality of diver units 100 to communicate with the beacon units 50 using the same frequency. TDMA divides the communication spectrum into sequential time slots that are used to transmit and/or receive data. A device transmits and/or receives only in its assigned time slot(s). The set of non-repeating time slots constitutes a frame. Normally, a frame is a fixed-length. In the present invention, the frame is a variable length frame that accommodates propagation delays between diver units 100 and beacon units 50.

If Chip Scale Atomic Clocks are included in the beacon unit 50 and diver units 100, then clock synchronization is maintained over a usefully long time. In this case, the beacon units 50 can be programmed to periodically transmit its location. Passing divers or submarines can receive the signal and calculate their distance from the beacon unit 50 by the Time of Arrival method. This method allows divers and submarines to maintain stealth.

Figure 11:
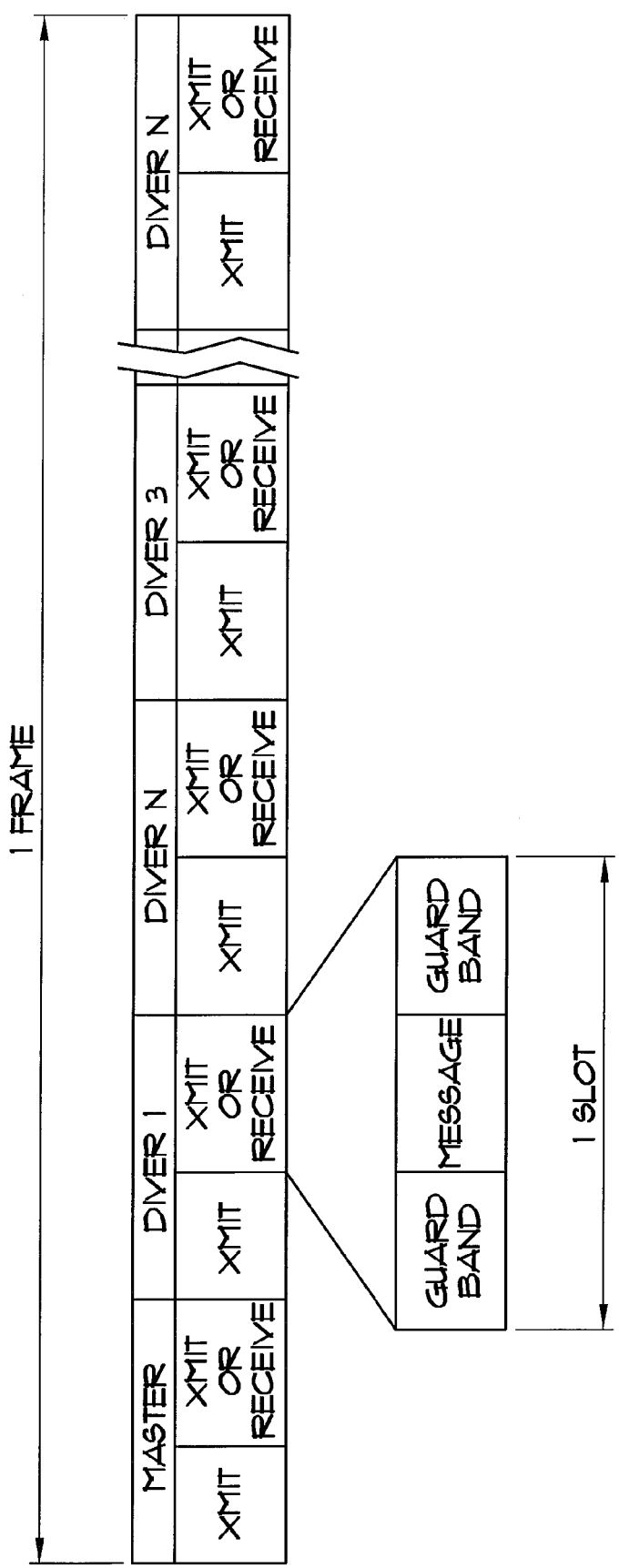
FIG. 11 illustrates an exemplary time division multiple access scheme for underwater communication.

FIG. 11 illustrates the frame structure of a TDMA frame accommodating n diver units 100. The frame is divided into 2n slots of 20 msec duration each, where n is the number of diver units 100. One diver unit 100 is designated as the master diver unit 100 and controls communications. The master unit may be selected, for example, by choosing the one with the highest or lowest unit ID. The master diver unit 100 assigns timeslots to the other diver units 100. The first two time slots in the frame are reserved for the master diver unit 100. Each diver unit 100 controls the use of its allocated time slots. A diver unit 100 may use its first timeslot to transmit a request message to a beacon unit 50 or other diver unit 100, and its second timeslot to receive a response message from the beacon unit 50 or other diver unit 100.

FIG. 11 also illustrates the slot format. Within each time slot, there is a guard band at the beginning and end of the time slot. Those skilled in the art will appreciate that propagation delays may result in the transmission of one diver unit overlapping the time slot of another diver unit 100. The guard bands are preferably wide enough to account for overlapping signals due to propagation delay. The remaining time within each time slot is used to transmit message data. In one embodiment of the invention, each time slot is used to transmit or receive one message. However, those skilled in the art will appreciate that multiple messages could be transmitted in a single time slot if the duration of messages is short relative to the slot period. Conversely, if the message length is greater than the slot period, a message could be segmented and transmitted over multiple slots.

Figure 12:
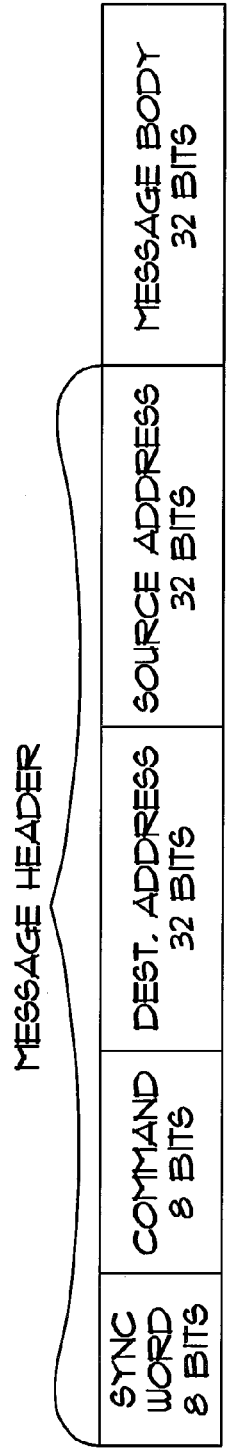
FIG. 12 illustrates an exemplary message format for underwater communications.

An exemplary message format is shown in FIG. 12. A message includes a message header and a message body. The message header includes a sync word (8 bits), command (8 bits), destination address (32 bits), and source address (32 bits). The sync word is a known bit pattern used to indicate the start of a message. The command element indicates the message type to the receiving unit. If a message spans multiple time slots, the command element could be used to indicate whether the message data contained in the current slot is a continuation of the message transmitted in the previous slot. The destination address indicates the intended recipient of the message. The source address element indicates the sender of the message. The messages may be encoded to enable detection and/or correction of transmission errors. For example, the messages may be encoded using Reed-Solomon codes, convolutional codes, Turbo codes, or other forward error correction codes.

As shown in FIG. 11, the diver units 100 transmit in a predetermined sequence. In this exemplary embodiment, only diver units 100 have assigned slots. Beacon units 50 transmit only in response to the diver units in the second slot after receiving a message from the diver unit 100. In other embodiments, beacon units could also be assigned slots and initiate communications with diver units 100. Before communications begin, the master diver unit 100 establishes the transmit order and notifies the other diver units 100 of their place in the sequence. During an initialization procedure, the master diver unit 100 transmits an initialization message to the other diver units 100 that identifies the preceding diver unit 100 in the sequence. The other diver units 100 acknowledge the initialization message. During normal operations, each diver unit 100 listens for the address of the preceding diver unit 100, which can be determined by the source address element of the messages transmitted using slot 1, and the source address or destination address of messages using slot 2.

A problem may arise when an obstruction blocks signals between two diver units 100 that transmit consecutively. In this situation, the second diver unit 100 may not be able to "hear" communications from the first diver unit 100. One consequence is that communications will stall because the second diver unit 100 will not transmit. In this situation, the master diver unit 100 may restart a transmit sequence if no signals are detected within a predetermined period of time. If the communications continue to stall, the master diver unit 100 can invoke the initialization procedure to change the transmit order. If changing the transmit order does not solve the problem, the diver unit 100 that is stalling the communications can be dropped from the transmit sequence.

Underwater communications between the diver units 100 and beacon units 50 occur at sonar frequencies. In the exemplary embodiment, the carrier frequency is 200 kilohertz and the bit period is 0.06 msecs (60 μsec), which equates to a data transmission rate of approximately 15.56 kbps. A message comprises a total of 112 bits plus 8 sync bits. Thus, it takes 7.2 msec to transmit the message. The 112 bit message contains 32 bits of user data. The other bits (command, source address, destination address, etc.) are "overhead." Thus, the effective data rate is 32 bits/7.2 msec=417 bits per second, assuming zero inter-message gap, i.e. no "listen" intervals.

Figure 13:
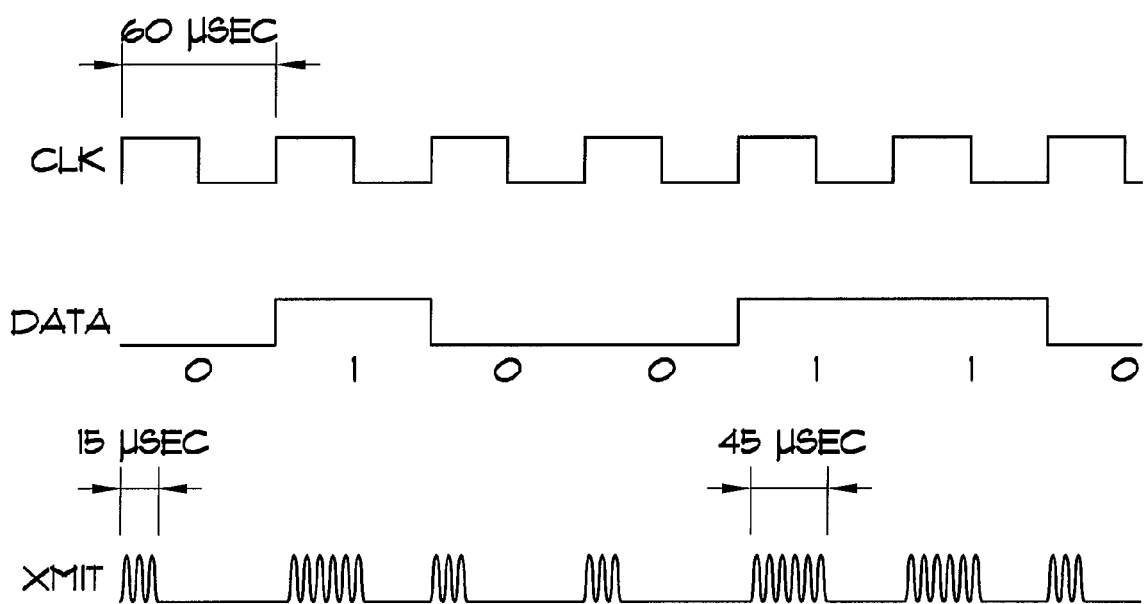
FIG. 13 illustrates an exemplary modulation scheme for underwater communications

FIG. 13 illustrates how data is modulated onto a carrier frequency. FIG. 13 illustrates a clock signal, data signal, and modulation signal. The clock signal has a period of 60 μsec, which is equal to the bit period. The data signal represents binary data that is being transmitted. The modulation signal comprises a pulse train at the same frequency as the clock signal. The pulse width of a given pulse in the modulation signal is determined by the state of the data signal. When the data signal is low, a relatively short pulse is generated to indicate a "0" bit. Conversely, when the data signal is high, a relatively long pulse is generated to indicate a "1" bit. In the exemplary embodiment, the short pulses indicative of a 0 bit are 15 microseconds in duration and the long pulses indicative of a 1 bit are 45 microseconds. On/Off keying is used to modulate the carrier. The carrier is turned on when the modulation signal is high, and is turned off when the modulation signal is low. The receiver samples the signal 37 microseconds after detecting the rising edge of a pulse to detect the signal. In an alternative embodiment, a variable sampling time after detection of the rising edge may be used to compensate for variations in the clock rate at the transmitter and/or variations due to Doppler shift of the carrier frequency. More particularly, the receiving unit may measure the time between rising edges of the pulses in the received signal to determine the period and adjust the sampling time accordingly. The measurement of the clock period may be performed when the sync word is being transmitted. In one exemplary embodiment, the sampling time $T_s$ is determined by multiplying the transmit clock period by 0.625.

The present invention may, of course, be carried out in other specific ways than those herein set forth without departing from the scope and essential characteristics of the invention. The present embodiments are, therefore, to be considered in all respects as illustrative and not restrictive, and all changes coming within the meaning and equivalency range of the appended claims are intended to be embraced therein.

The invention claimed is:

1. An underwater navigation system comprising:
 a location reference unit including:
  a receiver to receive navigation signals from a navigation system,
  a transceiver configured to communicate with one or more sub-surface beacon units and to transmit location information to said sub-surface beacon units; and
  processing circuits configured to determine a location of the location reference unit based on said navigation signals and to transmit location information to one or more beacon units; and
 a plurality of sub-surface beacon units adapted to sink to the sea floor when deployed, each said beacon unit including:
  processing circuits configured to determine the location of the beacon unit based on location information received from the location reference unit and/or other beacon unit; and
  a transceiver configured to receive said location information from said location reference unit and/or other beacon unit and to transmit location information to a guided unit to provide navigation assistance to the guided unit.

2. The underwater navigation system of claim 1 wherein the receiver comprises a Global Positioning System receiver to receive navigation signal from GPS satellites.

3. The underwater navigation system of claim 1 wherein the location reference unit comprises a surface buoy.

4. The underwater navigation system of claim 3 wherein said processing circuits are further configured to generate a control signal for sinking or destroying said surface buoy after transmitting location information to one or more beacon units, and wherein the location reference unit further includes a relay responsive to said control signal from the processing circuits for sinking or destroying said surface buoy.

5. The underwater navigation system of claim 4 wherein the location reference unit comprises a water craft on the surface of the water.

6. The underwater navigation system of claim 1 wherein the location reference unit comprises an aircraft and wherein said transceiver comprises a dipping transceiver.

7. The underwater navigation system of claim 1 wherein the location reference unit comprises an underwater craft traveling below the water surface.

8. The underwater navigation system of claim 7 wherein the location reference unit further includes an inertial or Doppler navigation system to track the location of said location reference unit relative to a known location.

9. The underwater navigation system of claim 1 wherein each beacon unit determines its location based on its distance from at least one location reference unit and/or other beacon unit.

10. The underwater navigation system of claim 9 wherein each beacon unit determines its location by triangulation based on its distance from a plurality of location reference units and/or beacon units.

11. The underwater navigation system of claim 9 wherein the beacon units determine distance from the location reference unit and/or other beacon unit based on the time of arrival of a signal transmitted by the location reference unit or beacon unit.

12. The underwater navigation system of claim 9 wherein the beacon units determine distance from the location reference unit and/or other beacon unit based on the time of travel of a signal transmitted by the location reference unit.

13. The underwater navigation system of claim 9 wherein the beacon units determine distance from the location reference unit and/or other beacon unit based on the received power of a dual-tone signal.

14. The underwater navigation system of claim 1 wherein each beacon unit determines its location based on its direction and distance from at least one location reference unit and/or other beacon unit.

15. The underwater navigation system of claim 14 wherein the beacon units includes a plurality of transducers, and wherein the processing circuits determine direction to the location reference unit based on the time difference of arrival of a signal transmitted by the location reference unit at said plurality of transducers.

16. The underwater navigation system of claim 14 wherein said beacon units and/or said location reference units further comprise a compass for determining rotational orientation.

17. The underwater navigation system of claim 1 wherein the beacon units include an inactive mode and an active mode of operation.

18. The underwater navigation system of claim 17 wherein the beacon units switch from an inactive mode to an active mode of operation responsive to receipt of and activation code.

19. The underwater navigation system of claim 17 wherein the beacon units switch from an active mode to an inactive mode of operation responsive to receipt of and deactivation code.

20. The underwater navigation system of claim 17 wherein the beacon units switch from an active mode to an inactive mode of operation after a determined period has elapsed without receiving a communication.

21. The underwater navigation system of claim 1 wherein said location reference units include a compass for determining rotational orientation.

22. The underwater navigation system of claim 1 wherein said beacon units further comprise a pressure sensor or other device to measure its depth below the surface of the water.

23. The underwater navigation system of claim 1 wherein said location reference units and/or said beacon units initiate the transmission of message(s) for determining distance using the time of arrival method when the m low-order bits of the transmitting unit's digital clock equal zero.

24. The underwater navigation system of claim 1 wherein a location reference unit is configured to sink below the surface of the water and to act as a beacon unit after initializing at least one other beacon unit.

25. The underwater navigation system of claim 1 wherein the location reference unit further includes an RF transceiver for communicating with other location reference units.

* * * * *